United States Patent [19]
Lee

[11] Patent Number: 6,167,164
[45] Date of Patent: Dec. 26, 2000

[54] ONE-DIMENSIONAL SIGNAL ADAPTIVE FILTER FOR REDUCING BLOCKING EFFECT AND FILTERING METHOD

[75] Inventor: Yung-lyul Lee, Seoul, Rep. of Korea

[73] Assignee: SamSung Electronics Co., Ltd., Kyungki-Do, Rep. of Korea

[21] Appl. No.: 09/037,878

[22] Filed: Mar. 10, 1998

[30] Foreign Application Priority Data

Mar. 10, 1997 [KR] Rep. of Korea .................. 97-7896
Apr. 4, 1997 [KR] Rep. of Korea ................. 97-12497

[51] Int. Cl.[7] .............................. G06K 9/40; G06K 9/46; G06K 9/56; G06T 5/00
[52] U.S. Cl. ................. 382/261; 382/268; 382/199; 382/205
[58] Field of Search ................... 382/260, 261, 382/264, 266, 268, 269, 250, 252, 199, 205; 358/432, 433, 465, 466

[56] References Cited

U.S. PATENT DOCUMENTS

| 5,121,447 | 6/1992 | Tanioka et al. | 382/261 |
| 5,220,616 | 6/1993 | Downing et al. | 382/261 |
| 5,818,964 | 10/1998 | Itoh | 382/205 |
| 5,883,983 | 3/1999 | Lee et al. | 382/268 |

FOREIGN PATENT DOCUMENTS

| 4-180381 | 6/1992 | Japan | H04N 7/13 |
| 5-110871 | 4/1993 | Japan | H04N 1/415 |
| 8-79752 | 3/1996 | Japan | H04N 7/30 |
| 8-181990 | 7/1996 | Japan | H04N 7/30 |

*Primary Examiner*—Scott Rogers
*Attorney, Agent, or Firm*—Sughrue, Mion, Zinn, Macpeak & Seas, PLLC

[57] ABSTRACT

A one-dimensional signal adaptive filtering method and a one-dimensional signal adaptive filter. The one-dimensional signal adaptive filtering method capable of reducing a blocking effect of image data when a frame is composed of blocks of a predetermined size includes the steps of: (a) applying a one-dimensional window of a predetermined size along the boundaries of the blocks to perform a predetermined gradient operation on each pixel within the one-dimensional window; (b) calculating threshold values (T) for each pixel within the one-dimensional window, which is determined by a predetermined function of a quantization step (Q); (c) comparing the results of the gradient operation on each pixel within the one-dimensional window with the corresponding calculated threshold value to generate a comparison result as a binary edge map; (d) applying a one-dimensional filter window of a predetermined size on the generated binary edge map to generate weighted values using the binary value belonging to the one-dimensional filter window; and (e) performing filtering using the generated weighted values to generate new pixel values. The effect of the method is to eliminate blocking noise from a restored block-based image, thereby enhancing an image restored from compression.

25 Claims, 5 Drawing Sheets

| S0 | S1 | S2 | S3 |
|----|----|----|----|
| 1  | 2  | 1  | 1  |

| S0 | S1 | S2 | S3 |
|----|----|----|----|
| 1  | 1  | 2  | 1  |

| S0 | S1 | S2 | S3 |
|----|----|----|----|
| 0  | 2  | 1  | 1  |

$a'2=(int)\{2b+c+d)/4+0.5\}$

| S0 | S1 | S2 | S3 |
|----|----|----|----|
| 1  | 2  | 0  | 0  |

$a'2=(int)(a+2b)/3+0.5)$

| S0 | S1 | S2 | S3 |
|----|----|----|----|
| 1  | 2  | 1  | 0  |

$a'2=(int)\{(a+2b+c)/4+0.5\}$

| S0 | S1 | S2 | S3 |
|----|----|----|----|
| ▨  | 2  | 1  | 1  |

$a'2=(2b+c+d)>>2$

| S0 | S1 | S2 | S3 |
|----|----|----|----|
| 6  | 10 | ▨  | ▨  |

$a'2=(6a+10b)>>4$

| S0 | S1 | S2 | S3 |
|----|----|----|----|
| 1  | 4  | 2  | 1  |

$a'2=(a+4b+2c+d)>>3$

| S0 | S1 | S2 | S3 |
|----|----|----|----|
| 1  | 2  | 1  | ▨  |

$a'2=(a+2b+c)>>2$

| S0 | S1 | S2 | S3 |
|----|----|----|----|
| ▨  | 10 | 6  | ▨  |

$a'2=(10b+6c)>>4$

EDGE

ONE-DIMENSIONAL SIGNAL ADAPTIVE FILTER FOR REDUCING BLOCKING EFFECT AND FILTERING METHOD

BACKGROUND OF THE INVENTION

1. Field of the Invention

The present invention relates to a data filter, and more particularly, to a one-dimensional signal adaptive filter for reducing blocking noise, and a one-dimensional signal adaptive filtering method.

2. Description of the Related Art

Generally, picture encoding standards such as MPEG of the International Standardization Organization (ISO) and H.263 recommended by the International Telecommunication Union (ITU) adopt block-based motion estimation and discrete cosine transform (DCT) of blocks. When an image is highly compressed, the block-based coding may cause the well-known blocking effect. A typical blocking effect is grid noise in a homogeneous area in which adjacent pixels have relatively similar pixel values. Another blocking effect is staircase noise which has a staircase shape and is generated along the edges of the image.

Grid noise shows traces of the block-based process at the edges between blocks when the compressed data is displayed on a screen after being restored. Thus, one can identify the edges between blocks. Also, staircase noise has a staircase shape at the edges of the image, so that one can notice a bumpy edge on the image.

In order to reduce the blocking effect occurring when block-based coding is performed, several methods have been suggested. According to H.261 encoding, a simple 3×3 low pass filter (LPF) is used as a loop filter to reduce the blocking effect. However, when using the 3×3 LPF, the extent to which the blocking effect can be removed is limited and the amount of calculation required is increased.

SUMMARY OF THE INVENTION

To solve the above problems, it is an object of the present invention is to provide a one-dimensional signal adaptive filtering method for reducing a blocking effect in high compression encoding and a one-dimensional signal adaptive filter used therefor, in which a one-dimensional filter window and a one-dimensional signal adaptive filter are used to sharply reduce the blocking effect caused when block-based coding is performed.

According to an aspect of the present invention, there is provided a one-dimensional signal adaptive filtering method capable of reducing a blocking effect of image data when a frame is composed of blocks of a predetermined size, the method comprising the steps of: (a) applying a one-dimensional window of a predetermined size along the boundaries of the blocks to perform a predetermined gradient operation on each pixel within the one-dimensional window; (b) calculating threshold values (T) to each pixel within the one-dimensional window, which is determined by a predetermined function of a quantization step (Q); (c) comparing the results of the gradient operation on each pixel within the one-dimensional window with the corresponding calculated threshold value to generate a comparison result as a binary edge map; (d) applying a one-dimensional filter window of a predetermined size on the generated binary edge map to generate weighted values using the binary value belonging to the one-dimensional filter window; and (e) performing filtering using the generated weighted values to generate new pixel values.

Preferably, the one-dimensional window of the step (a) of performing the gradient operation is placed such that its central pixels are centered around the boundaries of the blocks, and includes a 1×4 one-dimensional horizontal window and a 4×1 one-dimensional vertical window.

Preferably, the one-dimensional window of the step (a) of performing the gradient operation is placed such that its central pixels are centered around the boundaries of the blocks, and includes a 1×6 one-dimensional horizontal window and a 6×1 one-dimensional vertical window.

Preferably, when the binary values obtained in the step (c) are different between the horizontal and vertical windows when the horizontal and vertical windows are applied, the corresponding pixel is determined as an edge pixel, and when the quantization step (Q) of a quantizer is less than a predetermined value N1, filtering is not performed.

Preferably, in the step (b) of calculating the threshold values (T), assuming that the pixels of the horizontal (1×4) and vertical (4×1) one-dimensional windows are designated as p0, p1, p2 and p4 from the left and the top, respectively, the threshold values of the left and upper pixels p1 adjacent to the block boundary are set to 2Q−4, and the threshold values of the remaining pixels p1, p2 and p3 are set to Q+2 when a frame to be filtered is an intraframe, and the threshold value T− is set to Q if the quantization step Q is greater than the predetermined value N1 and less than a predetermined value N2 and the threshold value T is set to a predetermined value N3 if the quantization step Q is equal to or greater than the predetermined value N2 when the frame to be filtered is an interframe.

Also, preferably, in the step (b) of calculating the threshold values (T), assuming that the pixels of the horizontal (1×6) and vertical (6×1) one-dimensional window are designated as p0, p1, p2, p3, p4 and p5 from the left and the top, respectively, the threshold values of the left and the upper pixels p2 adjacent to the block boundary are set to 2Q−4, and the threshold values of the remaining pixels p0, p1, p3, p4 and p5 are set to Q+2 when a frame to be filtered is an intraframe, and the threshold value T is set to Q if the quantization step Q is greater than the predetermined value N1 and less than a predetermined value N2 and the threshold value T is set to a predetermined value N3 if the quantization step Q is equal to or greater than the predetermined value N2 when the frame to be filtered is an interframe.

Preferably, assuming that four pixels of the 1×4 one-dimensional horizontal window are designated as p0, p1, p2 and p3 from the left, the corresponding pixel values are designated as a, b, c and d, the pixel to the right of the pixel p3 is designated as p4, and the corresponding pixel value of the pixel p4 is designated as e, the gradient operation value of the pixel p0 is equal to $|a-b|$, the gradient operation value of the pixel p1 is equal to $|b-c|$, the gradient operation value of the pixel p2 is equal to $|c-d|$, and the gradient operation value of the pixel p3 is equal to $|d-e|$, and the gradient operation value of each pixel within the 4×1 one-dimensional vertical window is calculated based on the same principle as that applied to the 1×14 one-dimensional horizontal window.

Preferably, assuming that six pixels of the 1×6 one-dimensional horizontal window are designated as p0, p1, p2, p3, p4 and p5 from the left, the corresponding pixel values are designated as a, b, c, d, e and f, the pixel to the right of the pixel p5 is designated as p6, and the corresponding pixel value of the pixel p6 is designated as g, the gradient operation value of the pixel p0 is equal to $|a-b|$, the gradient operation value of the pixel p1 is equal to $|b-c|$, the gradient operation value of the pixel p2 is equal to |c–d|, the gradient operation value of the pixel p3 is equal to |d–e|, the gradient operation value of the pixel p4 is equal to |e–f|, and the gradient operation value of the pixel p5 is equal to |f–g|, and the gradient operation value of each pixel within the 6×1 one-dimensional vertical window is calculated based on the same principle as that applied to the 1×16 one-dimensional horizontal window.

Preferably, assuming that four pixels of the one-dimensional filter window are referred to as s0, s1, s2 and s3, the one-dimensional filter window of the step (d) is applied only to the pixels s1 and s2, and the basic weighted value of the filter window applied to the pixel s1 is set to (1, 2, 1, 1) and the basic weighted value of the filter window applied to the pixel s2 is set to (1, 1, 2, 1), wherein the weighted value of the filter window on the pixel s1 is not set if the pixel s1 is an edge pixel, and set to the basic weighted value of (1, 2, 1, 1) if neither the pixel s1 nor any of the remaining pixels s0, s2 and s3 is an edge pixel, and the weighted values of the edge pixels among the basic weighted values are set to 0 if the pixels s0, s2 and s3 are edge pixels, and the weighted value of the pixel s3 is set to 0 if the weighted value of the pixel s2 is set to 0, and the weighted value of the filter window on the pixel s2 is set based on the same principle as that applied to the pixel s1.

Preferably, assuming that four pixels of the one-dimensional filter window are designated as s0, s1, s2 and s3, the one-dimensional filter window of the step (d) is applied only to the pixels s1 and s2, and the predetermined weighted values set depending on edge information by each pixel of the one-dimensional filter window are applied in the step (d), and a bit shift operation is performed in the step (e) in order to generate new pixel values.

Preferably, constituents of a filter window for the pixel s1 are s0, s1, s2 and s3 and filtering is performed using its basic weighted value of (1, 2, 1, 1), constituents of a filter window for the pixel s2 are s1, s2, s3 and s4 and filtering is performed using its basic weighted value of (1, 2, 1, 1), constituents of a filter window for the pixel s3 are s1, s2, s3 and s4 and filtering is performed using its basic weighted value of (1, 1, 2, 1), and constituents of a filter window for the pixel s4 are s2, s3, s4 and s5 and filtering is performed using its basic weighted value of (1, 1, 2, 1), and the weighted value of each filter window for the pixels s2, s3 and s4 is generated based on the same principle as that applied to the pixel s1.

According to another aspect of the present invention, there is provided a one-dimensional signal adaptive filter comprising: an image storing unit for temporarily storing an image data; a threshold value calculator for calculating threshold values (T) using a predetermined function of a quantization step (Q) stored in the image storing unit; a gradient operation unit for applying a one-dimensional window of a predetermined size along the boundaries of blocks of a predetermined size constituting an image frame stored in the image storing unit, and performing a predetermined gradient operation on each pixel constituting the one-dimensional window; a threshold value comparator for comparing the result of each pixel of the one-dimensional window, obtained by the gradient operation unit, with the corresponding threshold value (T) calculated by the threshold value calculator; a binary edge map generator for generating the result of the threshold comparator as a binary value for each pixel; a weighted filter value generator for applying a one-dimensional filter window of a predetermined size on the binary edge map generated by the binary edge map generator, and generating a weighted value only on the edge pixel belonging to the one-dimensional filter window, wherein a weighted value is not generated on a pixel which is not an edge pixel; and a one-dimensional weighted filter for performing filtering using the weighted value generated by the weighted filter value generator to generate new pixel values.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

Figure 1:
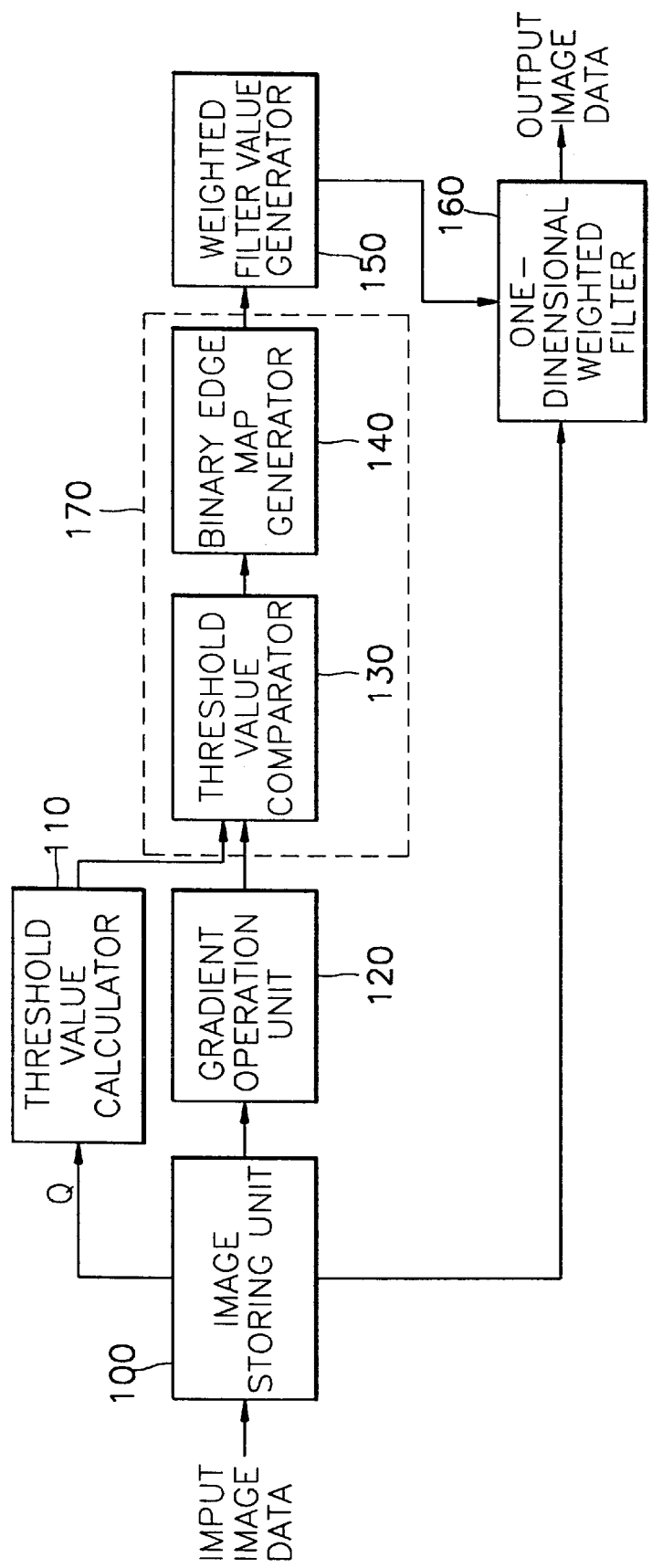
FIG. 1 is a block diagram of a one-dimensional signal adaptive filter according to a preferred embodiment of the present invention.
Figure 2A:
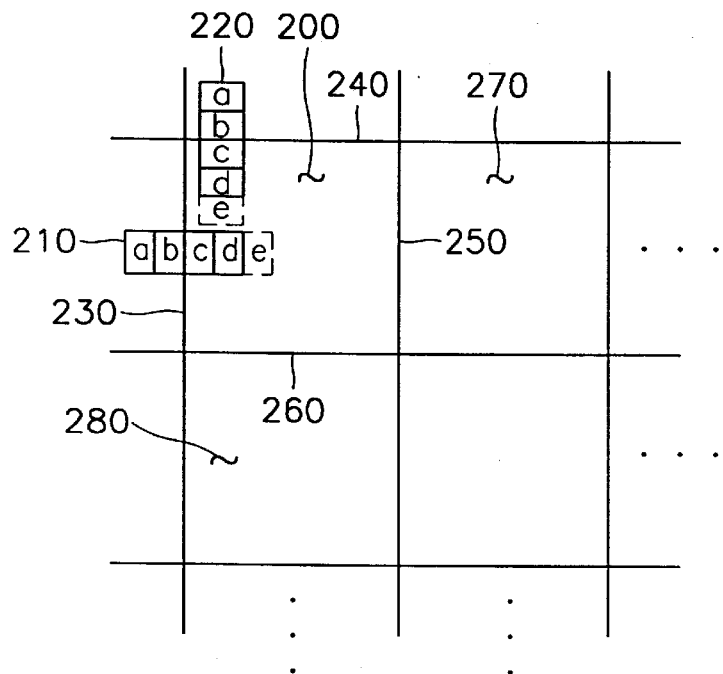
FIG. 2A shows blocks and a 1×4 one-dimensional window when an image frame is divided into blocks of 8×8 (or 16×16) pixels, according to an embodiment of the present invention.
Figure 2B:
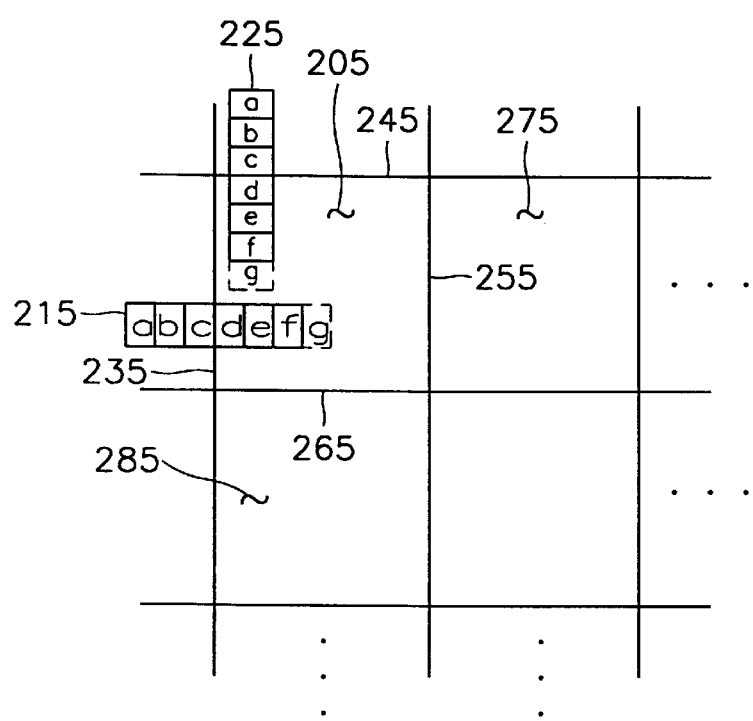
FIG. 2B shows blocks and a 1×6 one-dimensional window when an image frame is divided into blocks of 8×8 (or 16×16) pixels, according to another embodiment of the present invention.
Figure 3A:
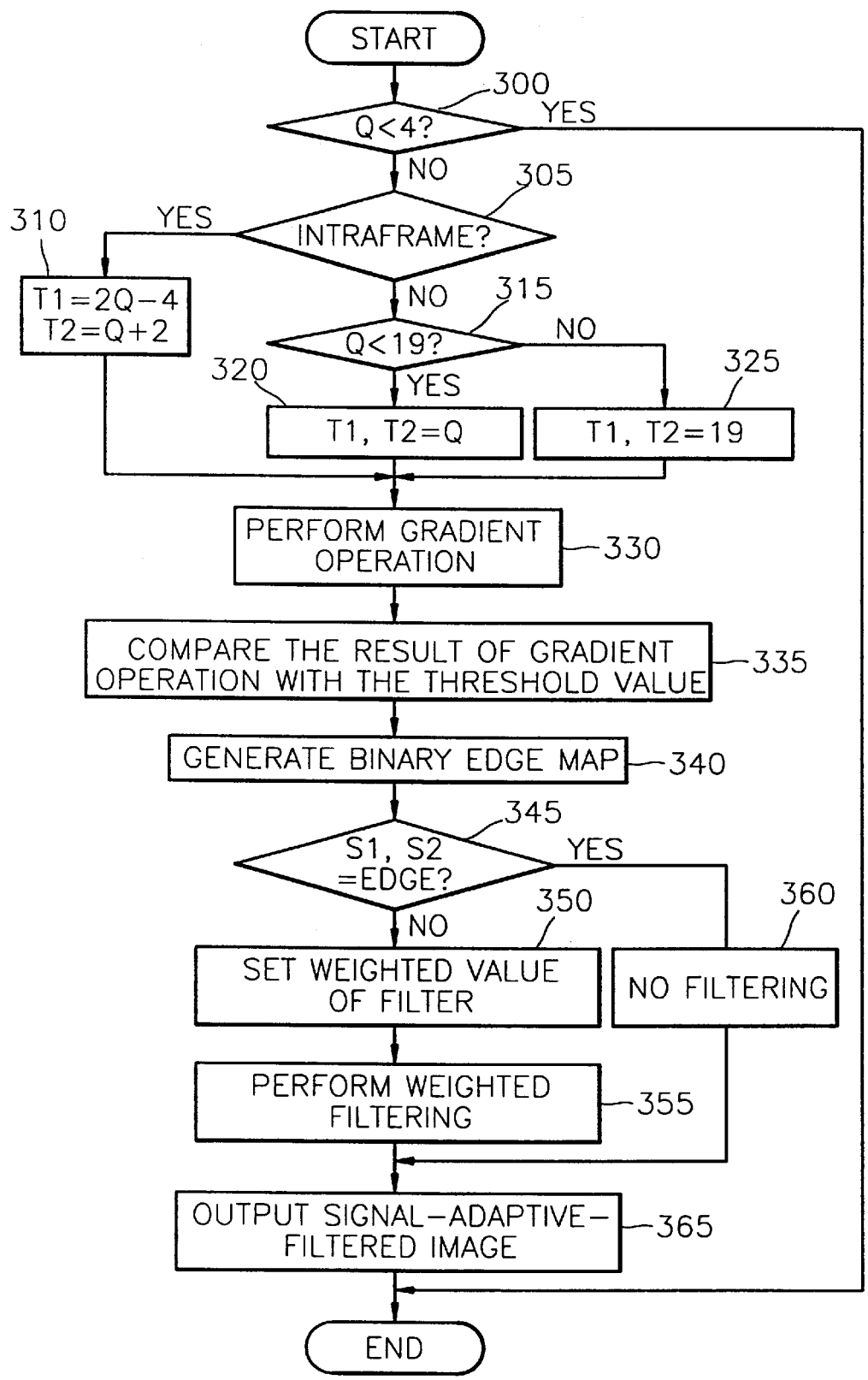
FIG. 3A is a flowchart illustrating a one-dimensional signal adaptive filtering method when applying the window of FIG. 2A.
Figure 3B:
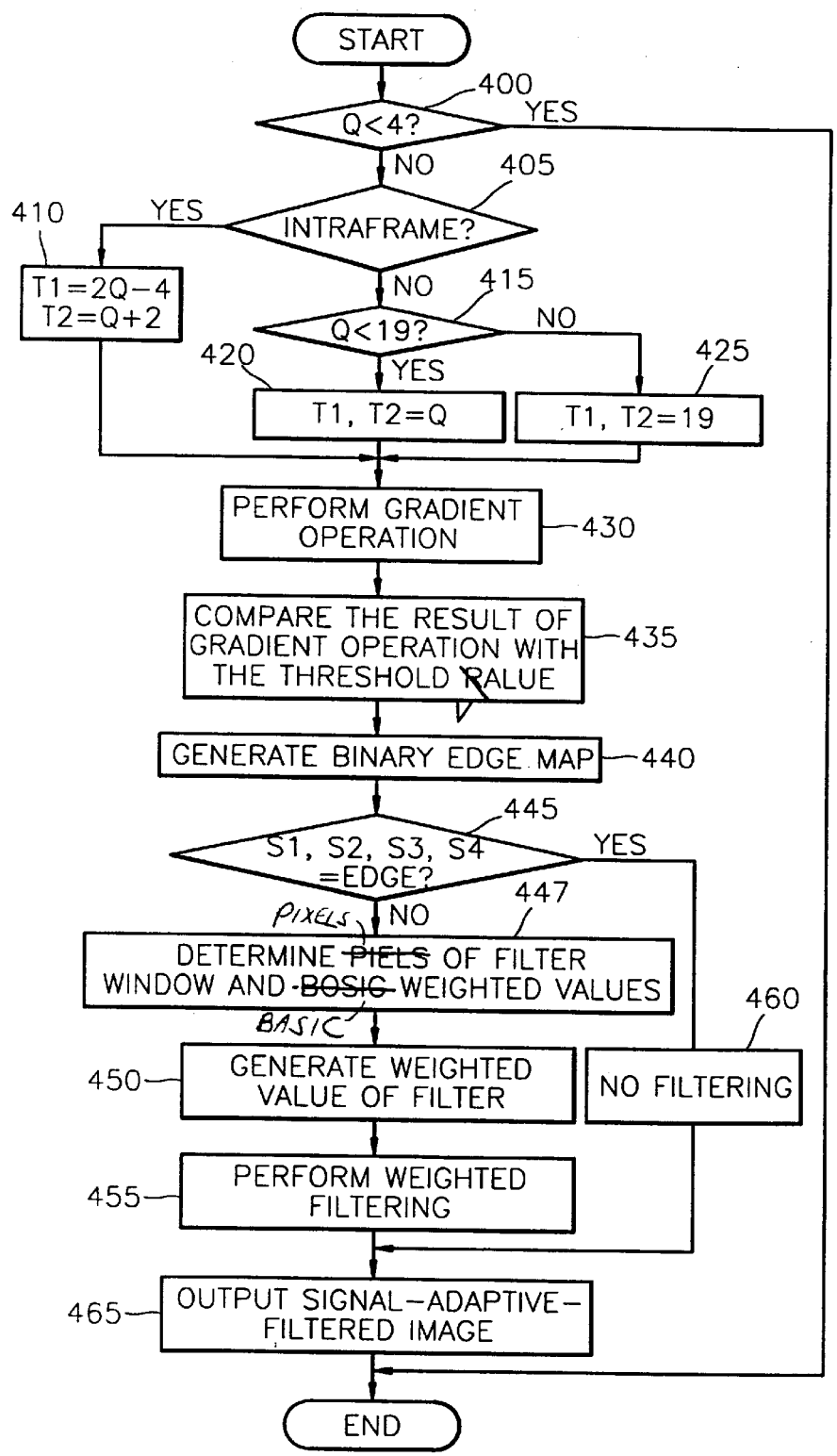
FIG. 3B is a flowchart illustrating a one-dimensional signal adaptive filtering method when applying the window of FIG. 2B.

In FIG. 1, a one-dimensional signal adaptive filter according to a preferred embodiment of the present invention, includes an image storing unit 100, a threshold value calculator 110, a gradient operation unit 120, a threshold value comparator 130, a binary edge map generator 140, a weighted filter value generator 150 and a one-dimensional weighted filter 160. FIG. 2A shows a block 200 and 1×4 one-dimensional windows 210 and 220 when an image frame is divided into blocks of 8×8 (or 16×16) pixels, according to a preferred embodiment of the present invention, and FIG. 2B shows a block 205 and 1×6 one-dimensional windows 215 and 225 when an image frame is divided into blocks of 8×8 (or 16×16) pixels, according to another embodiment of the present invention. FIG. 3A illustrates the signal adaptive filtering method using the windows shown in FIG. 2A, and FIG. 3B illustrates the signal adaptive filtering method using the windows shown in FIG. 2B.

First, the signal adaptive filtering method when the 1×4 one-dimensional windows shown in FIG. 2A are applied will be described. The image storing unit 100 temporarily stores the image data with a blocking effect. The threshold value calculator 110 receives a predetermined quantization step Q from the image storing unit 100 to calculate a threshold value T. In this embodiment, when the quantization step Q of a quantizer is less than 4, filtering is not performed. Signal adaptive filtering is performed (step 300) only when the quantization step Q is equal to or greater than 4.

Also, the threshold value T calculated by the threshold calculator 110 differs depending on whether a frame to be filtered is an intraframe or an interframe. Thus, the frame to be filtered is determined to be an intraframe or an interframe (step 305).

Assuming that four pixels belonging to the 1×4 one-dimensional horizontal window 210 are designated as p0, p1, p2 and p3, and pixel values thereof are a, b, c and d, and the pixel to the right of the pixel p3 is referred to as p4, and the pixel value of the pixel p4 is e, the threshold value T1 with respect to the pixel p1 adjacent to the block boundary is set to 2Q−4 when the frame to be filtered is an intraframe. Also, the threshold value T2 with respect to the remaining pixels p0, p2 and p3 is set to Q+2 (step 310).

Also, when the frame to be filtered is an interframe, a determination is made as to whether the quantization step Q is less than 19 (step 315). If the quantization step Q is less than 19, the threshold value T1 (or T2) is set to Q (step 320). However, if the quantization step Q is equal to or greater than 19, the threshold value T1 (or T2) is set to 19 (step 325).

The gradient operation unit 120 applies a predetermined size of one-dimensional window, preferably, 1×4 size, along the boundary of the blocks when the image frame of the image storing unit 100 is divided into blocks with a predetermined size, to perform a gradient operation in which absolute values of the difference between adjacent pixels composing the one-dimensional window are calculated (step 330). FIG. 2A shows the block 200, and one-dimensional windows 210 and 220 when the image frame is divided into blocks of 8×8 (or 16×16) pixels. Here, the one-dimensional windows 210 and 220 which are a 1×4 horizontal window, and a 4×1 vertical window, respectively, in which their central pixels b and c are centered around the boundaries 230 and 240 of the block 200, respectively.

Also, the gradient operation on each pixel located within the one-dimensional horizontal window 210 is performed by calculating the absolute value of the difference between each pixel and its adjacent pixel. That is, the gradient operation value of the pixel p0 is equal to |a−b|, the gradient operation value of the pixel p1 is equal to |b−c|, the gradient operation value of the pixel p2 is equal to |c−d|, and the gradient operation value of the pixel p3 is equal to |d−e|. In the same manner, the gradient operation is performed on each pixel with the one-dimensional vertical window 220 based on the same principle applied to the one-dimensional horizontal window 210. Here, the gradient operation is performed only on the left-hand boundary 230 and the upper boundary 240 of the block 200. The gradient operation on the right-hand boundary 250 and the lower boundary 260 of the block 200 is performed in the right block 270 and the lower block 280.

The threshold value comparator 130 compares each gradient operation value of the pixels within the one-dimensional windows, calculated by the gradient operation unit 120, with the threshold value T calculated by the threshold calculator 110, to determine whether or not the pixel is an edge pixel (step 335). Also, the binary edge map generator 140 generates the results of the threshold value comparator 130 as a binary value for each pixel (step 340).

On the other hand, when embodying the threshold value comparator 130 and the binary edge map generator 140 as software, the comparator 130 and the binary edge map generator 140 are constructed as one module. Here, such module may be referred to as the binary edge map generating portion 170.

The operations of the threshold value comparator 130 and the binary edge map generator 140 will be described in detail. The threshold value comparator 130 compares the gradient operation values of each pixel with the threshold value T calculated by the threshold value calculator 110. If the gradient operation value is greater than the threshold value T, the pixel is determined as an edge pixel and edge information edge[0] of the first pixel p0 is set to 1. Meanwhile, if the gradient value is less than the threshold value T, the pixel is determined as a non-edge pixel, and the edge information edge[0] of the first pixel p0 is set to 0. In the same manner, the binary edge map information edge[1], edge[2] and edge[3] of the pixels p1, p2 and p3 are calculated. By doing so, the binary edge map information in the horizontal and vertical directions are generated by applying one-dimensional windows along the boundaries of the blocks. On the other hand, if the binary edge map information in the horizontal and vertical directions are different, the corresponding pixel is determined as an edge pixel, thus its binary edge map information is set to 1.

The weighted filter value generator 150 generates weighted values according to the binary edge map information within the one-dimensional filter window by applying 1×4 one-dimensional filter windows to the binary edge map information generated by the binary edge map generator 140.

The one-dimensional weighted filter 160 filters the data of the image storing unit 100 using the weighted values generated by the weighted filter value generator 150 to generate new pixel values. Assuming that four pixels belonging to the one-dimensional filter window are designated as s0, s1, s2 and s3, and filter coefficients (or weighted values) are designated as w1, w2, w3 and w4, filtering is performed only on the pixels s1 and s2. That is, the one-dimensional weighted filter 160 performs filtering using the weighted values generated by the weighted filter value generator 150 to generate new pixel values of the pixels s1 and s2. That is, assuming that the pixel values of the pixels s1 and s2, stored in the image storing unit 100, are a2 and a3, respectively, the pixel values are changed into a'2 and a'3, respectively.

Figures 4A, 4B, 5A, 5B, 5C, 6A, 6B, 6C, 6D, 6E:
FIGS. 4A and 4B show basic weighted values of the filter windows applied to pixels s1 and s2, respectively.
FIGS. 5A through 5C show weighted values and pixel values according to the pixel information of the one-dimensional filter window.
FIGS. 6A through 6E show pixel weighted values and pixel values for integer operation of the one-dimensional filter window.

The operations of the weighted filter value generator 150 and the one-dimensional weighted filter 160 will be described in detail. First, the basic weighted value of the filter window applied to the pixel s1 is set to (1, 2, 1, 1) as shown in FIG. 4A, and the basic weighted value of the filter window applied to the pixel s2 is set to (1, 1, 2, 1), respectively.

Then, in order to determine the weighted value of the filter window on the pixel s1, a determination is made as to whether or not the pixel s1 is an edge pixel (step 345). If the pixel s1 is an edge pixel, the weighted value is not generated and the one-dimensional filtering is not performed (step 360). If the pixel s1 is not an edge pixel, an appropriate weighted value is set depending on the values of the other pixels s0, s2 and s3 (step 350). For example, if the pixel s1 is not an edge pixel and the pixels s0, s2 and s3 belonging to the filter window are not edge pixels, filtering is performed using the weighted values of FIG. 4A. Assuming that the pixel s1 is not an edge pixel, and at least one of the pixels s0, s2 and s3 within the filter window is an edge pixel, the pixels s0 and s1 are checked. If the pixel s0 is an edge pixel, the weighted value w1 corresponding to the pixel s0 is set to 0 as shown in FIG. 5A. If the pixel s2 is an edge pixel, the weighted values w3 and w4 corresponding to the pixels s2 and s3 are set to 0 as shown in FIG. 5B. If the pixel s3 is an edge pixel, the weighted value w4 corresponding to the pixel s3 is set to 0 as shown in FIG. 5C. Also, the weighted values of the one-dimensional filter window for the pixel s2 are determined in the same manner as that for the pixels s1.

When the weighted values are set as above, weighted filtering is performed (step 355). An example of the weighted filtering based on the set weighted values is as follows. When the original pixel values of the one-dimensional filter window are a, b, c and d, the pixel value a'2 of the pixel s1 when using the weighted values of FIG. 5A becomes the integer part of the result of (2b+c+d)/4+0.5. In FIGS. 5A through 5C, "int" represents the function of taking the integer part of the subsequent value. In the same manner, when using the weighted values of FIG. 5B, the pixel value a'2 becomes the integer part of the result of (a+2b)/3+0.5. Also, when using the weighted values of FIG. 5C, the pixel value a'2 becomes the integer part of the result of (a+2b+c)/4+0.5. The pixel values of the pixel s2 are calculated by weighted filtering which is the same as that applied to the pixel s1.

On the other hand, in the weighted filtering method illustrated with reference to FIGS. 5A through 5C, a floating point operation is performed, thus the process takes much time. Thus, weighted filtering may be performed based on the integer. It is assumed that the pixels of the 1×4 one-dimensional window are s0, s1, s2 and s3, and the pixel values of the pixels are a, b, c and d, respectively. FIG. 6A shows the weighted values when the pixel s0 is an edge pixel. Here, the hatched portion represents an edge pixel, and the weighted value of the edge pixel is equal to 0. The pixel value a'2 of the pixel s1 is calculated by (2b+c+d)>>2. Here, ">>" represents a right shift operation. In the same manner, FIG. 6B shows the weighted values when the pixels s2 and s3 are edge pixels, and the pixel value a'2 of the pixel s1 is calculated by (6a+10b)>>4. FIG. 6C shows the weighted values when there are no pixels on the edge, and the pixel value a'2 of the pixel s1 is calculated by (a+4b+2c+d)>>3. FIG. 6D shows the weighted values when the pixel s3 is an edge pixel, and the pixel value a'2 of the pixel s1 is calculated by (a+2b+c)>>2. FIG. 6E shows the weighted values when the pixels s0 and s3 are edge pixels, and the pixel value a'2 of the pixel s1 is calculated by (10b+6c)>>4. Also, the pixel value a'3 of the pixel s2 is calculated based on the same principle as that for the pixel value a'2 of the pixel s1.

Hereinafter, the signal adaptive filtering method according to another example of the present invention will be described, in which a block 205 and 1×6 one-dimensional windows 215 and 225 are applied. FIG. 3B illustrates the signal adaptive filtering method when using the 1×6 one-dimensional windows 215 and 225 according to the present invention.

The functions and operations of the image storing unit 100 and the threshold value calculator 110 are the same as those in the first embodiment. As in the first embodiment, when the quantization step Q of a quantizer is less than 4, filtering is not performed. That is, the signal adaptive filtering is performed (step 400) only when the quantization step Q is equal to or greater than 4. The threshold value T calculated by the threshold calculator 110 differs depending on whether a frame to be filtered is an intraframe or an interframe. Thus, the frame to be filtered is determined to be either an intraframe or an interframe (step 405). Assuming that six pixels belonging to the 1×6 one-dimensional horizontal window 215 are designated as p0, p1, p2, p3, p4 and p5 from the left side, and pixels values thereof are a, b, c, d, e and f, and the pixel to the right of the pixel p5 is referred to as p6, and the pixel value of the pixel p6 is g, the threshold value T1 of the gradient operation value |c–d| of the pixel p2 adjacent to the block boundary is set to 2Q−4 when the frame to be filtered is an intraframe. Also, the threshold value T2 with respect to the remaining pixels p0, p1, p4 and p5 is set to Q+2 (step 410).

Also, when the frame to be filtered is an interframe, a determination is made as to whether the quantization step Q is less than 19 (step 415). If the quantization step Q is less than 19, the threshold value T1 (or T2) is set to Q (step 420). However, if the quantization step Q is equal to or greater than 19, the threshold value T1 (or T2) is set to 19 (step 425).

On the other hand, the gradient operation unit 120 applies the 1×6 one-dimensional window along the boundary of the blocks when the image frame of the image storing unit 100 is divided into blocks of a predetermined size, to perform a gradient operation through calculation of absolute values of the difference of adjacent pixels composing the one-dimensional window (step 430). Here, the one-dimensional windows 215 and 225 which are a 1×6 horizontal window and a 6×1 vertical window, respectively, in which their central pixels c and d are centered around the boundaries 235 and 245 of the block 205, respectively.

Also, the gradient operation on each pixel located within the one-dimensional horizontal window 215 is performed by calculating the absolute value of the difference between each pixel and its adjacent pixel. That is, the gradient operation value of the pixel p0 is equal to |a–b|, the gradient operation value of the pixel p1 is equal to |b–c|, the gradient operation value of the pixel p2 is equal to |c–d|, the gradient operation value of the pixel p3 is equal to |d–e|, the gradient operation value of the pixel p4 is equal to |e–f|, and the gradient operation value of the pixel p5 is equal to |f–g|. In the same manner, the gradient operation is performed on each pixel with the 6×1 one-dimensional vertical window 225 based on the same principle applied to the one-dimensional horizontal window 215. Here, the gradient operation is performed only on the left-hand boundary 235 and the upper boundary 245 of the block 200. The gradient operation on the right-hand boundary 255 and the lower boundary 265 of the block 205 is performed in the right block 275 and the lower block 285.

The threshold value comparator 130 compares each gradient operation value of the pixels within the one-dimensional windows, calculated by the gradient operation unit 120, with the threshold value T1 (or T2) calculated by the threshold calculator 110, to determine whether or not the pixel is an edge pixel (step 435). Also, the binary edge map generator 140 generates the results of the threshold value comparator 130 as a binary value for each pixel (step 440).

On the other hand, when embodying the threshold value comparator 130 and the binary edge map generator 140 as software, the threshold value comparator 130 and the binary edge map generator 140 are constructed as one module as in the first embodiment. Here, such module may be referred to as the binary edge map generating portion 170.

The operations of the threshold value comparator 130 and the binary edge map generator 140 will be described in detail. The threshold value comparator 130 compares the gradient operation values of each pixel with the threshold value T1 (or T2) calculated by the threshold value calculator 110. If the gradient operation value is greater than the threshold value T1 (or T2), the pixel is determined as an edge pixel and edge information edge[0] of the first pixel p0 is set to 1. Meanwhile, if the gradient value is less than the threshold value T1 (or T2), the pixel is determined as a non-edge pixel, and the edge information edge[0] of the first pixel p0 is set to 0. In the same manner, the binary edge map information edge[1], edge[2], edge[3], edge[4] and edge[5] of the pixels p1, p2, p3, p4 and p5 are calculated. Here, the threshold value T2 is applied to the edge information edge [2]. By doing so, the binary edge map information in the horizontal and vertical directions are generated by applying one-dimensional windows along the boundaries of the blocks. On the other hand, if the binary edge map information in the horizontal and vertical directions are different, the corresponding pixel is determined as an edge pixel, thus its binary edge map information is set to 1.

The weighted filter value generator 150 generates weighted values according to the binary edge map information within the one-dimensional filter window by applying 1×6 one-dimensional filter window to the binary edge map information generated by the binary edge map generator 140. The size of the one-dimensional filter window is not limited to 1×6, which is obvious to those skilled in the art.

The one-dimensional weighted filter 160 filters the data of the image storing unit 100 using the weighted values generated by the weighted filter value generator 150 to generate new pixel values. Assuming that six pixels in the horizontal or vertical direction around the boundaries of the blocks are designated as s0, s1, s2, s3, s4 and s5, and filter coefficients (or weighted values) corresponding thereto are referred to as w0, w1, w2, w3, w4 and w5, filtering is applied to only the pixels s1, s2, s3 and s4. That is, the one-dimensional weighted filter 160 performs filtering using the weighted values generated by the weighted filter value generator 150 to newly generate pixel values of the pixels s1, s2, s3 and s4. That is, assuming that the pixel values of the pixels s1, s2, s3 and s4, stored in the image storing unit 100, are a1, a2, a3 and a4, respectively, the pixel values are changed into a'1, a'2, a'3 and a'4, respectively.

The operations of the weighted filter value generator 150 and the one-dimensional weighted filter 160 will be described in detail. First, the basic weighted value of the filter window applied to the pixels s1 and s2 is set to (1, 2, 1, 1) as shown in FIG. 4A, and the basic weighted value of the filter window applied to the pixels s3 and s4 is set to (1, 1, 2, 1), respectively.

Then, in the case that the filter window for the pixel s1 consists of pixels s0, s1, s2 and s3, in order to determine the weighted value of the filter window on the pixel s1, a determination is made as to whether or not the pixel s1 is an edge pixel (step 445). If the pixel s1 is an edge pixel, the weighted value is not generated and the weighted one-dimensional filtering is not performed (step 460). That is, the pixel value of the pixel s1 remains unchanged. If the pixel s1 is not an edge pixel, the pixels s0, s1, s2 and s3 composing the filter window for the pixel s1 and the basic weighted value (1, 2, 1, 1) thereof are determined (step 447), and then an appropriate weighted value is set depending on the values of the other pixels s0, s2 and s3 (step 450). In detail, if the pixel s1 is not an edge pixel and none of the other pixels s0, s2 and s3 belonging to the filter window are edge pixels, filtering is performed using the weighted values of FIG. 4A. Assuming that the pixel s1 is not an edge pixel, and at least one of the pixels s0, s2 and s3 within the filter window is an edge pixel, the pixels s0 and s1 are checked. If the pixel s0 is an edge pixel, the weighted value w0 corresponding to the pixel s0 is set to 0 as shown in FIG. 5A. If the pixel s2 is an edge pixel, the weighted values w2 and w3 corresponding to the pixels s2 and s3 are set to 0 as shown in FIG. 5B. If the pixel s3 is an edge pixel, the weighted value w3 corresponding to the pixel s3 is set to 0 as shown in FIG. 5C.

Also, in order to determine the weighted value of the filter window for the pixel s2, the filter window for the pixel s2 consists of pixels s1, s2, s3 and s4, the filter window for the pixel s3 consists of pixels s2, s3, s4 and s5, and the filter window for the pixel s4 consists of pixels s3, s4, s5 and s6. Also, the weighted values of the one-dimensional filter windows for the pixels s2, s3 and s4 are determined by the same principle applied to determine those for the pixel s1. As described above, (1, 2, 1, 1) is used as the basic weighted value for the pixel s2, and (1, 1, 2, 1) is used as the basic weighted values for the pixels s3 and s4.

On the other hand, the steps 455 and 465 are the same as the steps 355 and 365 of the first embodiment, thus the explanation of these steps will be omitted.

It is obvious to those skilled in the art that the above embodiments can be used as a loop filter for an encoder, and can also be applied to a decoder. Also, it is obvious to those skilled in the art that mosquito noise can be reduced by applying the above filtering within an 8×8 block, thus the explanation thereof will be omitted.

As described above, in the one-dimensional signal adaptive method using a one-dimensional signal adaptive filter according to the present invention, blocking noise can be eliminated from an image restored from a block-based image, thereby enhancing the image restored from compression.

What is claimed is:

1. A one-dimensional signal adaptive filtering method capable of reducing a blocking effect of image data when a frame is composed of blocks of a predetermined size, the method comprising the steps of:
    (a) applying a one-dimensional window of a predetermined size along the boundaries of the blocks to perform a predetermined gradient operation on each pixel within the one-dimensional window, thereby obtaining a gradient operation result for each pixel;
    (b) calculating threshold values (T) of each pixel within the one-dimensional window according to a predetermined function of a quantization step (Q);
    (c) comparing the gradient operation results for each pixel within the one-dimensional window with corresponding ones of the threshold values calculated in step (b) to generate respective binary values for a binary edge map;
    (d) applying a one-dimensional filter window of a predetermined size on the generated binary edge map to generate weighted values using the binary values belonging to the one-dimensional filter window; and
    (e) performing filtering using the generated weighted values to generate new pixel values.

2. The one-dimensional signal adaptive filtering method of claim 1, wherein the one-dimensional window of the step (a) of performing the gradient operation is placed such that its central pixels are centered around the boundaries of the blocks, and includes a 1×4 one-dimensional horizontal window and a 4×1 one-dimensional vertical window.

3. The one-dimensional signal adaptive filtering method of claim 1, wherein the one-dimensional window of the step (a) of performing the gradient operation is placed such that its central pixels are centered around the boundaries of the blocks, and includes a 1×6 one-dimensional horizontal window and a 6×1 one-dimensional vertical window.

4. The one-dimensional signal adaptive filtering method of claim 2, wherein when the binary values obtained in the step (c) are different between the horizontal and vertical windows when the horizontal and vertical windows are applied, the corresponding pixel is determined as an edge pixel.

5. The one-dimensional signal adaptive filtering method of claim 3, wherein when the binary values obtained in the step (c) are different between the horizontal and vertical windows when the horizontal and vertical windows are applied, the corresponding pixel is determined as an edge pixel.

6. The one-dimensional signal adaptive filtering method of claim 2, wherein when the quantization step (Q) of a quantizer is less than a predetermined value N1, filtering is not performed.

7. The one-dimensional signal adaptive filtering method of claim 3, wherein when the quantization step (Q) of a quantizer is less than a predetermined value N1, filtering is not performed.

8. The one-dimensional signal adaptive filtering method of claim 2, wherein in the step (b) of calculating the threshold values (T), where the pixels of the horizontal and vertical one-dimensional windows are designated as p0, p1, p2 and p4 from the left and the top, respectively, the threshold values of the left and upper pixels p1 adjacent to the block boundary are set to 2Q−4, and the threshold values of the remaining pixels p1, p2 and p3 are set to Q+2 when a frame to be filtered is an intraframe, and the threshold value T is set to Q if the quantization step Q is greater than the predetermined value N1 and less than a predetermined value N2 and the threshold value T is set to a predetermined value N3 if the quantization step Q is equal to or greater than the predetermined value N2 when the frame to be filtered is an interframe.

9. The one-dimensional signal adaptive filtering method of claim 3, wherein in the step (b) of calculating the threshold values (T), where the pixels of the horizontal and vertical one-dimensional window are designated as p0, p1, p2, p3, p4 and p5 from the left and the top, respectively, the threshold values of the left and the upper pixels p2 adjacent to the block boundary are set to 2Q−4, and the threshold values of the remaining pixels p0, p1, p3, p4 and p5 are set to Q+2 when a frame to be filtered is an intraframe, and the threshold value T is set to Q if the quantization step Q is greater than the predetermined value N1 and less than a predetermined value N2 and the threshold value T is set to a predetermined value N3 if the quantization step Q is equal to or greater than the predetermined value N2 when the frame to be filtered is an interframe.

10. The one-dimensional signal adaptive filtering method of claim 8, wherein the predetermined value N1 is equal to 4, and both the predetermined values N2 and N3 are equal to 19.

11. The one-dimensional signal adaptive filtering method of claim 9, wherein the predetermined value N1 is equal to 4, and both the predetermined values N2 and N3 are equal to 19.

12. The one-dimensional signal adaptive filtering method of claim 2, wherein the gradient operation performed on each pixel within the one-dimensional window, of the step (a), is to calculate the absolute value of the difference between each pixel of the one-dimensional window and its adjacent pixel.

13. The one-dimensional signal adaptive filtering method of claim 12, wherein assuming that four pixels of the 1×4 one-dimensional horizontal window are designated as p0, p1, p2 and p3 from the left, the corresponding pixel values are designated as a, b, c and d, the pixel to the right of the pixel p3 is designated as p4, and the corresponding pixel value of the pixel p4 is designated as e, the gradient operation value of the pixel p0 is equal to $|a-b|$, the gradient operation value of the pixel p1 is equal to $|b-c|$, the gradient operation value of the pixel p2 is equal to $|c-d|$, and the gradient operation value of the pixel p3 is equal to $|d-e|$; and where four pixels of the 4×4 one-dimensional vertical window are designated as p0, p1, p2 and p3 from the top, the corresponding pixel values are designated as a, b, c and d, the pixel immediately below the pixel p3 is designated as p4, and the corresponding pixel value of the pixel p4 is designated as e, the gradient operation value of the pixel p0 is equal to $|a-b|$, the gradient operation value of the pixel p1 is equal to $|b-c|$, the gradient operation value of the pixel p2 is equal to $|c-d|$, and the gradient operation value of the pixel p3 is equal to $|d-e|$.

14. The one-dimensional signal adaptive filtering method of claim 3, wherein the gradient operation performed on each pixel within the one-dimensional window, of the step (a), is to calculate the absolute values of the difference between each pixel of the one-dimensional window and its adjacent pixel.

15. The one-dimensional signal adaptive filtering method of claim 14, wherein when six pixels of the 1×6 one-dimensional horizontal window are designated as p0, p1, p2, p3, p4 and p5 from the left, the corresponding pixel values are designated as a, b, c, d, e and f, the pixel to the right of the pixel p5 is designated as p6, and the corresponding pixel value of the pixel p6 is designated as g, the gradient operation value of the pixel p0 is equal to $|a-b|$, the gradient operation value of the pixel p1 is equal to $|b-c|$, the gradient operation value of the pixel p2 is equal to $|c-d|$, the gradient operation value of the pixel p3 is equal to $|d-e|$, the gradient operation value of the pixel p4 is equal to $|e-f|$, and the gradient operation value of the pixel p5 is equal to $|f-g|$; and when six pixels of the 6×1 one-dimensional horizontal window are designated as p0, p1, p2, p3, p4 and p5 from the top, the corresponding pixel values are designated as a, b, c, d, e and f, the pixel to the bottom of the pixel p5 is designated as p6, and the corresponding pixel value of the pixel p6 is designated as g, the gradient operation value of the pixel p0 is equal to $|a-b|$, the gradient operation value of the pixel p1 is equal to $|b-c|$, the gradient operation value of the pixel p2 is equal to $|c-d|$, the gradient operation value of the pixel p3 is equal to $|d-e|$, the gradient operation value of the pixel p4 is equal to $|e-f|$, and the gradient operation value of the pixel p5 is equal to $|f-g|$.

16. The one-dimensional signal adaptive filtering method of claim 2, wherein the one-dimensional filter window of the step (d) is a 1×4 filter window.

17. The one-dimensional signal adaptive filtering method of claim 16, wherein when four pixels of the one-dimensional filter window are referred to as s0, s1, s2 and s3, the one-dimensional filter window of the step (d) is applied only to the pixels s1 and s2, and a basic weighted value of the filter window applied to the pixel s1 is set to (1, 2, 1, 1) and a basic weighted value of the filter window applied to the pixel s2 is set to (1, 1, 2, 1), wherein the weighted value of the filter window on the pixel s1 is not set if the pixel s1 is an edge pixel, and set to the basic weighted value of (1, 2, 1, 1) if neither the pixel s1 nor any of the remaining pixels s0, s2 and s3 is an edge pixel, and the weighted values of the edge pixels among the basic weighted values are set to 0 if the pixels s0, s2 and s3 are edge pixels, and the weighted value of the pixel s3 is set to 0 if the weighted value of the pixel s2 is set to 0; and the weighted value of the filter window on the pixel s2 is not set if the pixel s2 is an edge pixel, and set to the basic weighted value of (1, 1, 2, 1) if neither the pixel s2 nor any of the remaining pixels s0, s1 and s3 is an edge pixel, and the weighted values of the edge pixels among the basic weighted values are set to 0 if the pixels s0, s1 and s3 are edge pixels.

18. The one-dimensional signal adaptive filtering method of claim 16, wherein assuming that four pixels of the one-dimensional filter window are designated as s0, s1, s2 and s3, the one-dimensional filter window of the step (d) is applied only to the pixels s1 and s2, and the predetermined weighted values set depending on edge information by each pixel of the one-dimensional filter window are applied in the step (d), and a bit shift operation is performed in the step (e) in order to generate new pixel values.

19. The one-dimensional signal adaptive filtering method of claim 3, wherein the one-dimensional filter window of the step (d) includes 1×4 and 4×1 filter windows, and when six pixels in the horizontal and vertical direction centered around the boundaries of the blocks are designated to as s0, s1, s2, s3, s4 and s5, respectively, the filtering of the step (e) is performed using the filter window on the pixels s1, s2, s3 and s4, wherein filtering is not performed on the pixel which is determined to have edge information in the step (c), and filtering is performed only on the pixel which is not an edge pixel.

20. The one-dimensional signal adaptive filtering method of claim 19, wherein constituents of a filter window for the pixel s1 are s0, s1, s2 and s3 and filtering is performed thereon using a basic weighted value of (1, 2, 1, 1), constituents of a filter window for the pixel s2 are s1, s2, s3 and s4 and filtering is performed thereon using a basic weighted value of (1, 2, 1, 1), constituents of a filter window for the pixel s3 are s1, s2, s3 and s4 and filtering is performed thereon using a basic weighted value of (1, 1, 2, 1), and constituents of a filter window for the pixel s4 are s2, s3, s4 and s5 and filtering is performed thereon using a basic weighted value of (1, 1, 2, 1), wherein the weighted value of the filter window for the pixel s1 is not set if the pixel s1 is an edge pixel, and set to the basic weighted value if neither the pixel s1 nor the remaining pixels s0, s2 and s3 are edge pixels, and the weighted values of the edge pixels among the basic weighted values are set to 0 if the pixels s0, s2 and s3 are edge pixels, and the weighted value of the pixel s3 is set to 0 if the weighted value of the pixel s2 is set to 0;

the weighted value of the filter window for the pixel s2 is not set if the pixel s2 is an edge pixel, and set to the basic weighted value if neither the pixel s2 nor the remaining pixels s1, s3 and s4 are edge pixels, and the weighted values of the edge pixels among the basic weighted values are set to 0 if the pixels s1, s3 and s4 are edge pixels;

the weighted value of the filter window for the pixel s3 is not set if the pixel s3 is an edge pixel, and set to the basic weighted value if neither the pixel s3 nor the remaining pixels s1, s2 and s4 are edge pixels, and the weighted values of the edge pixels among the basic weighted values are set to 0 if the pixels s1, s2 and s4 are the edge; and the weighted value of the filter window for the pixel s4 is not set if the pixel s4 is an edge pixel, and set to the basic weighted value if neither the pixel s4 nor the remaining pixels s2, s3 and s5 are edge pixels, and the weighted values of the edge pixels among the basic weighted values are set to 0 if the pixels s2, s3 and s5 are edge pixels.

21. The one-dimensional signal adaptive filtering method of claim 3, wherein when six pixels of the horizontal and vertical one-dimensional filter window are designated as s0, s1, s2, s3, s4 and s5 from the left and the top, respectively, filtering is performed on the pixels s1, s2, s3 and s4 by using the one-dimensional filter windows, and the predetermined weighted values set depending on edge information of each pixel of the one-dimensional filter windows are applied in the step (d), and a bit shift operation is performed in the step (e) in order to generate the new pixel values.

22. A one-dimensional signal adaptive filter comprising:

an image storing unit for temporarily storing an image data;

a threshold value calculator for calculating threshold values (T) using a predetermined function of a quantization step (Q) stored in the image storing unit;

a gradient operation unit for applying a one-dimensional window of a predetermined size along the boundaries of blocks of a predetermined size constituting an image frame stored in the image storing unit, and performing a predetermined gradient operation on each pixel constituting the one-dimensional window, thereby obtaining a gradient operation result for each pixel;

a threshold value comparator for comparing the gradient operation result of each pixel of the one-dimensional window, obtained by the gradient operation unit, with the corresponding threshold value (T) calculated by the threshold value calculator, thereby generating a result for each pixel;

a binary edge map generator for generating the result for each pixel of the threshold value comparator as a binary value for each pixel;

a weighted filter value generator for applying a one-dimensional filter window of a predetermined size on the binary edge map generated by the binary edge map generator, and generating a weighted value only of the edge pixel belonging to the one-dimensional filter window, wherein a weighted value is not generated of a pixel which is not an edge pixel; and a one-dimensional weighted filter for performing filtering using the weighted value generated by the weighted filter value generator to generate new pixel values.

23. The one-dimensional signal adaptive filter of claim 22, wherein the one-dimensional window of the gradient operation unit is placed such that its central pixels are centered around the boundaries of the blocks, and includes a 1×4 one-dimensional horizontal window and a 4×1 one-dimensional vertical window.

24. The one-dimensional signal adaptive filter of claim 22, wherein the one-dimensional window of the gradient operation unit is placed such that its central pixels are centered around the boundaries of the blocks, and includes a 1×6 one-dimensional horizontal window and a 6×1 one-dimensional vertical window.

25. The one-dimensional signal adaptive filter of claim 22, wherein the one-dimensional weighted filter is 1×4 in size.

* * * * *